(12) United States Patent
Oh (10) Patent No.: US 12,329,594 B2
(45) Date of Patent: Jun. 17, 2025

(54) DENTAL FLOSS PICK

(71) Applicant: Jay K Oh, Wyckoff, NJ (US)

(72) Inventor: Jay K Oh, Wyckoff, NJ (US)

( * ) Notice: Subject to any disclaimer, the term of this patent is extended or adjusted under 35 U.S.C. 154(b) by 393 days.

(21) Appl. No.: 18/111,914

(22) Filed: Feb. 21, 2023

(65) Prior Publication Data

US 2024/0277459 A1    Aug. 22, 2024

(51) Int. Cl.
*A61C 15/00* (2006.01)
*A61C 15/04* (2006.01)

(52) U.S. Cl.
CPC .......... *A61C 15/046* (2013.01); *A61C 15/043* (2013.01)

(58) Field of Classification Search
CPC ..... A61C 15/04; A61C 15/043; A61C 15/046; A61C 15/048
See application file for complete search history.

(56) References Cited

U.S. PATENT DOCUMENTS

| | | | | |
|---|---|---|---|---|
| 1,588,307 A * | 6/1926 | Cammack | ............ | A61C 15/046 132/326 |
| 1,640,607 A * | 8/1927 | Kitley | ................. | A61C 15/046 132/325 |
| 1,700,550 A * | 1/1929 | Stafford | .............. | A61C 15/046 132/325 |
| 2,163,500 A * | 6/1939 | Shepard | .............. | A61C 15/046 132/326 |
| 2,187,442 A * | 1/1940 | Beach | ................. | A61C 15/046 132/326 |
| 2,516,539 A * | 7/1950 | Atols | ................... | A61C 15/046 132/326 |
| 2,724,390 A * | 11/1955 | Sokoloski | ............ | A61C 15/046 132/326 |
| 2,742,047 A * | 4/1956 | Ness | ..................... | A61C 15/046 132/326 |
| 2,853,082 A * | 9/1958 | Nelson | .................. | A61C 15/046 D28/68 |
| 3,592,203 A * | 7/1971 | Johnson | ............... | A61C 15/046 132/323 |
| 3,734,107 A * | 5/1973 | Thierman | ............ | A61C 15/046 132/325 |
| 3,746,017 A * | 7/1973 | Casselman | ........... | A61C 15/046 132/325 |
| 3,747,611 A * | 7/1973 | Bennington | ......... | A61C 15/043 132/325 |

(Continued)

*Primary Examiner* — Rachel R Steitz
(74) *Attorney, Agent, or Firm* — JIKIM LAW (57) ABSTRACT

The present invention is a dental floss pick that includes a length of floss, a first elongate arm, a second elongate arm, a vertical support, a first rotational gate, a first stop member, a base member, and a lock button. The vertical support has a first end, a second end, and an open bottom. The first elongate arm is secured to the first end. The second elongate arm is secured to the second end. The open bottom has a first threading. The first rotational gate is located within the first elongate arm. The first stop member is located adjacent to the first rotational gate. The base member has an open top, a feed portion of floss, and a closed bottom. The open top has a second threading. The second threading is complementary to the first threading of the vertical support to secure the base member to the vertical support. The length of floss is configured to extend between the first elongate arm and the feed portion of floss. The lock button is disposed in the base member.

20 Claims, 4 Drawing Sheets

(56) References Cited

U.S. PATENT DOCUMENTS

| | | | | |
|---|---|---|---|---|
| 3,915,178 A * | 10/1975 | Zellers | A61C 15/046 |
| | | | D28/68 |
| 3,927,687 A * | 12/1975 | Thierman | B65H 75/28 |
| | | | 242/588.6 |
| 4,898,196 A * | 2/1990 | Eason | A61C 15/046 |
| | | | 132/327 |
| 4,936,326 A * | 6/1990 | Eckroat | A61C 15/046 |
| | | | 132/326 |
| 5,020,554 A * | 6/1991 | Feinberg | A61C 15/046 |
| | | | 132/327 |
| 5,060,681 A * | 10/1991 | Westbrook | A61C 15/046 |
| | | | 132/324 |
| 5,139,038 A | 8/1992 | El Gazayerli | |
| 5,217,031 A * | 6/1993 | Santoro | A61C 15/047 |
| | | | 132/322 |
| 5,224,502 A * | 7/1993 | Walker, Jr. | A61C 15/046 |
| | | | 132/324 |
| 5,251,651 A * | 10/1993 | Mason | A61C 15/043 |
| | | | 132/324 |
| 5,375,614 A | 12/1994 | Navratil | |
| 5,375,615 A * | 12/1994 | Wahlstrom | A61C 15/046 |
| | | | 132/324 |
| 5,495,863 A * | 3/1996 | Bergman | A61C 15/046 |
| | | | 132/325 |
| 5,787,908 A | 8/1998 | Robinson | |
| 5,881,744 A * | 3/1999 | Lo | A61C 15/046 |
| | | | 132/325 |
| 6,382,219 B1 | 5/2002 | Jelten | |
| 6,874,509 B2 * | 4/2005 | Bergman | A61C 15/048 |
| | | | 132/324 |
| 7,082,950 B2 * | 8/2006 | Kossak | A61C 15/046 |
| | | | 132/325 |
| 7,201,173 B2 * | 4/2007 | Shen | A61C 15/043 |
| | | | 132/327 |
| 7,588,035 B2 * | 9/2009 | Ponzini | A61C 15/041 |
| | | | 132/321 |
| 7,631,650 B2 * | 12/2009 | Major | A61C 15/046 |
| | | | 132/325 |
| 7,793,379 B2 * | 9/2010 | Weiss | A46B 7/023 |
| | | | 433/141 |
| 10,709,531 B1 * | 7/2020 | Urso | A61C 15/04 |
| 2002/0020427 A1 * | 2/2002 | Lin | A61C 15/046 |
| | | | 132/321 |
| 2002/0170570 A1 * | 11/2002 | Bergman | A61C 15/048 |
| | | | 132/322 |
| 2003/0106565 A1 * | 6/2003 | Andrews | A61C 15/046 |
| | | | 132/325 |
| 2005/0252520 A1 * | 11/2005 | Filsouf | A61C 15/046 |
| | | | 132/235 |
| 2005/0263169 A1 * | 12/2005 | Romine | A61C 15/043 |
| | | | 132/321 |
| 2007/0204879 A1 * | 9/2007 | Chen | A61C 15/046 |
| | | | 132/325 |
| 2014/0305460 A1 * | 10/2014 | Sebhatu | A61C 15/042 |
| | | | 132/200 |
| 2023/0270531 A1 * | 8/2023 | Bushman | A61C 15/046 |
| | | | 132/323 |
| 2024/0277459 A1 * | 8/2024 | Oh | A61C 15/043 |

* cited by examiner

DENTAL FLOSS PICK

TECHNICAL FIELD & BACKGROUND

The present invention generally related to a dental floss pick, and in particular, to an improved dental floss pick.

Traditional dental floss picks pollute the environment. The floss picks are made from hard plastic, and cannot be recycled due to their mixed material nature. Once the floss picks have been used, the floss picks must be thrown away because reusing the floss picks can risk redistributing bacteria. As such, each floss pick that has been used has ended up in a landfill, or polluting some nature area.

Therefore, it would be desirable to provide an improved dental floss pick that could allow a user to re-use without risking redistributing bacteria or polluting the environment.

SUMMARY OF THE INVENTION

The present invention is directed to a dental floss pick that overcomes the above-mentioned disadvantages of the prior art.

In one aspect, the present invention provides a dental floss pick having a first elongate arm, a second elongate arm, a length of floss, a vertical support, a first channel, a second channel, a cutting member, a first rotational gate, a first stop member, a base member, a first line guide, and a lock button. The first elongate arm has a first surface, a second surface, and a third surface. The first surface is curved, the second surface is biased inwardly therein, and the third surface is positioned between the first surface and the second surface. The second elongate arm has a first surface, a second surface, and a third surface. The first surface is curved, the second surface is biased inwardly therein, and the third surface is positioned between the first surface and the second surface. The second surface of the first elongate arm faces the second surface of the second elongate arm. The third surface of the first elongate arm and the third surface of the second elongate arm are in spaced parallel relationship. The second elongate arm has an identical material and thickness of the first elongate arm. The vertical support has a first end, a second end, and an open bottom. The first elongate arm is secured to the first end. The second elongate arm is secured to the second end. The vertical support has the first and second elongate arms being spaced apart from each other providing tension to the first and second elongate arms to retain the length of floss. The open bottom has a first threading. The first channel is disposed in the third surface of the first elongate arm. The first channel is configured to secure the length of floss therein. The second channel is disposed in the third surface of the second elongate arm for enabling the length of floss to exit the second elongate arm. The second channel is configured to secure the length of floss therein. The length of floss is configured to extend out of the second elongate arm through the second channel of the second elongate arm and straight between the third surface of the first elongate arm and the third surface of the second elongate arm. The first surface of the first elongate arm has an aperture for enabling the length of floss to exit the first elongate arm. The cutting member is secured to the first surface of the first elongate arm for cutting the length of floss. The first rotational gate is located within the first elongate arm. The first stop member is located adjacent to the first rotational gate. The first stop member is arranged to prevent rotational movement of the first rotational gate in a rearward direction opposite to a forward direction of the length of floss to prevent the length of floss from moving past the first rotational gate in the rearward direction to retain the length of floss between the third surface of the first elongate arm and the third surface of the second elongate arm when lateral pressure is applied to the length of floss. The base member has an open top, a feed portion of floss, and a closed bottom. The open top has a second threading. The second threading is complementary to the first threading of the vertical support to secure the base member to the vertical support. The feed portion of floss is positioned between the open top and the closed bottom. The first line guide is positioned adjacent to the open top of the base member for enabling the length of floss to exit outwardly from the base member. The length of floss is configured to extend between the first elongate arm and the feed portion of floss. The lock button is disposed in the base member. The lock button is configured to protrude through the base member for enabling selective operation by a user. The lock button is configured to move toward the feed portion of floss. The lock button is configured to resiliently restrain the feed portion of floss when lateral pressure is applied to the lock button by the user.

In another aspect, the present invention provides a dental floss pick has a dental floss pick having a first elongate arm, a second elongate arm, a length of floss, a vertical support, a first channel, a second channel, a cutting member, a first rotational gate, a first stop member, a base member, a third line guide, and a lock button. The first elongate arm has a first surface, a second surface, and a third surface. The first surface is curved, the second surface is biased inwardly therein, and the third surface is positioned between the first surface and the second surface. The second elongate arm has a first surface, a second surface, and a third surface. The first surface is curved, the second surface is biased inwardly therein, and the third surface is positioned between the first surface and the second surface. The second surface of the first elongate arm faces the second surface of the second elongate arm. The third surface of the first elongate arm and the third surface of the second elongate arm are in spaced parallel relationship. The second elongate arm has an identical material and thickness of the first elongate arm. The vertical support has a first end, a second end, and an open bottom. The first elongate arm is secured to the first end. The second elongate arm is secured to the second end. The vertical support has the first and second elongate arms being spaced apart from each other providing tension to the first and second elongate arms to retain the length of floss. The open bottom has a first threading. The third line guide is positioned adjacent to the open bottom of the vertical support for enabling the length of floss to travel within the vertical support. The first channel is disposed in the third surface of the first elongate arm. The first channel is configured to secure the length of floss therein. The second channel is disposed in the third surface of the second elongate arm for enabling the length of floss to exit the second elongate arm. The second channel is configured to secure the length of floss therein. The length of floss is configured to extend out of the second elongate arm through the second channel of the second elongate arm and straight between the third surface of the first elongate arm and the third surface of the second elongate arm. The first surface of the first elongate arm has an aperture for enabling the length of floss to exit the first elongate arm. The cutting member is secured to the first surface of the first elongate arm for cutting the length of floss. The first rotational gate is located within the first elongate arm. The first stop member is located adjacent to the first rotational gate. The first stop member is arranged to prevent rotational movement of the first rotational gate in a rearward direction opposite to a forward direction of the length of floss to prevent the length of floss from moving past the first rotational gate in the rearward direction to retain the length of floss between the third surface of the first elongate arm and the third surface of the second elongate arm when lateral pressure is applied to the length of floss. The base member has an open top, a feed portion of floss, and a closed bottom. The open top has a second threading. The second threading is complementary to the first threading of the vertical support to secure the base member to the vertical support. The feed portion of floss is positioned between the open top and the closed bottom. The length of floss is configured to extend between the first elongate arm and the feed portion of floss. The lock button is disposed in the base member. The lock button is configured to protrude through the base member for enabling selective operation by a user. The lock button is configured to move toward the feed portion of floss. The lock button is configured to resiliently restrain the feed portion of floss when lateral pressure is applied to the lock button by the user.

In a further aspect, the present invention provides a dental floss pick has a dental floss pick having a first elongate arm, a second elongate arm, a length of floss, a vertical support, a first channel, a second channel, a cutting member, a first rotational gate, a first stop member, a base member, and a lock button. The first elongate arm has a first surface, a second surface, and a third surface. The first surface is curved, the second surface is biased inwardly therein, and the third surface is positioned between the first surface and the second surface. The second elongate arm has a first surface, a second surface, and a third surface. The first surface is curved, the second surface is biased inwardly therein, and the third surface is positioned between the first surface and the second surface. The second surface of the first elongate arm faces the second surface of the second elongate arm. The third surface of the first elongate arm and the third surface of the second elongate arm are in spaced parallel relationship. The second elongate arm has an identical material and thickness of the first elongate arm. The vertical support has a first end, a second end, and an open bottom. The first elongate arm is secured to the first end. The second elongate arm is secured to the second end. The vertical support has the first and second elongate arms being spaced apart from each other providing tension to the first and second elongate arms to retain the length of floss. The open bottom has a first threading. The first channel is disposed in the third surface of the first elongate arm. The first channel is configured to secure the length of floss therein. The second channel is disposed in the third surface of the second elongate arm for enabling the length of floss to exit the second elongate arm. The second channel is configured to secure the length of floss therein. The length of floss is configured to extend out of the second elongate arm through the second channel of the second elongate arm and straight between the third surface of the first elongate arm and the third surface of the second elongate arm. The first surface of the first elongate arm has an aperture for enabling the length of floss to exit the first elongate arm. The cutting member is secured to the first surface of the first elongate arm for cutting the length of floss. The first rotational gate is located within the first elongate arm. The first stop member is located adjacent to the first rotational gate. The first stop member is arranged to prevent rotational movement of the first rotational gate in a rearward direction opposite to a forward direction of the length of floss to prevent the length of floss from moving past the first rotational gate in the rearward direction to retain the length of floss between the third surface of the first elongate arm and the third surface of the second elongate arm when lateral pressure is applied to the length of floss. The base member has an open top, a feed portion of floss, and a closed bottom. The open top has a second threading. The second threading is complementary to the first threading of the vertical support to secure the base member to the vertical support. The feed portion of floss is positioned between the open top and the closed bottom. The length of floss is configured to travel within the vertical support and the base member. The length of floss is configured to extend between the first elongate arm and the feed portion of floss. The lock button is disposed in the base member. The lock button is configured to protrude through the base member for enabling selective operation by a user. The lock button is configured to move toward the feed portion of floss. The lock button is configured to resiliently restrain the feed portion of floss when lateral pressure is applied to the lock button by the user.

BRIEF DESCRIPTION OF THE DRAWINGS

The present invention will be described by way of exemplary embodiments, but not limitations, illustrated in the accompanying drawing in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments. Various operations will be described as multiple discrete operations, in turn, in a manner that is most helpful in understanding the present invention. However, the order of description should not be construed as to imply that these operations are necessarily order dependent. In particular, these operations need not be performed in the order of presentation. The phrase "in one embodiment" is used repeatedly. The phrase generally does not refer to the same embodiment, however, it may. The terms "comprising", "having" and "including" are synonymous, unless the context dictates otherwise.

This present invention provides a dental floss pick 100 that could allow a user to re-use without risking redistributing bacteria or polluting the environment.

Figure 1:
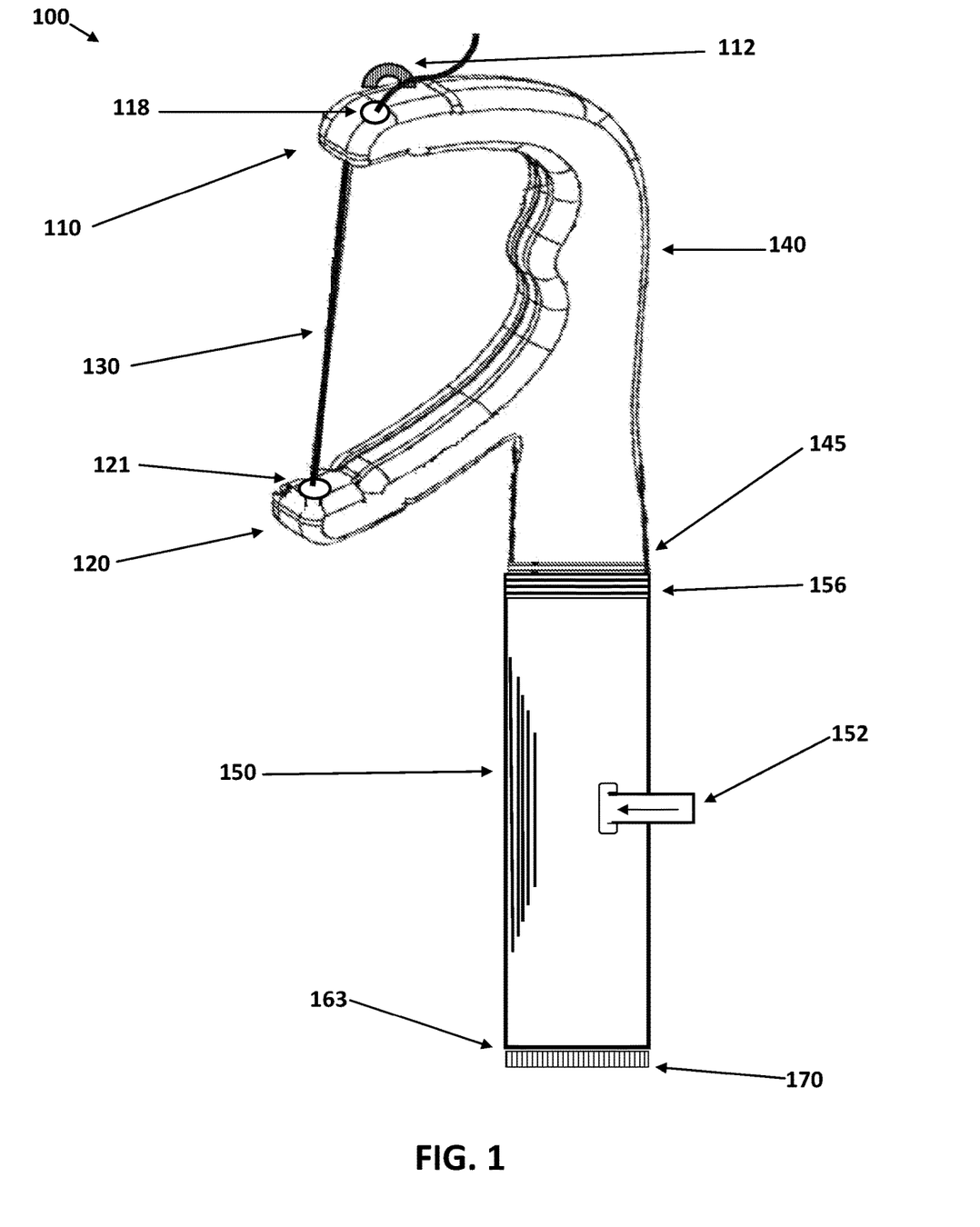
FIG. 1 illustrates a perspective view of a dental floss pick, in accordance with one embodiment of the present invention.

FIG. 1 illustrates a perspective view of a dental floss pick 100, in accordance with one embodiment of the present invention.

Figure 2:
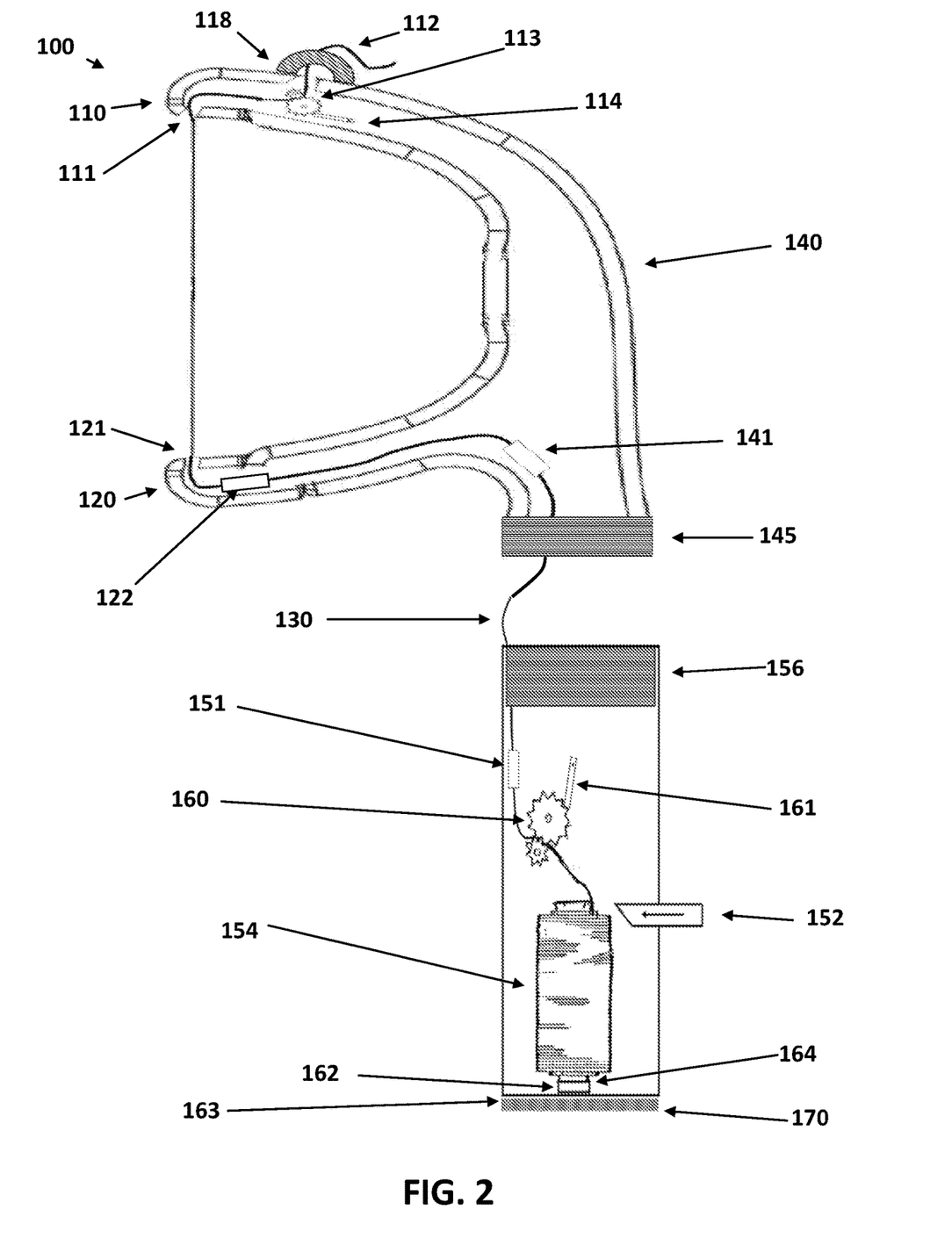
FIG. 2 illustrates a front view of a dental floss pick, in accordance with one embodiment of the present invention.

FIG. 2 illustrates a front view of a dental floss pick 100, in accordance with one embodiment of the present invention.

Referring to FIGS. 1 and 2, a dental floss pick 100 includes a first elongate arm 110, a second elongate arm 120, a length of floss 130, a vertical support 140, a first channel 111, a second channel 121, a cutting member 112, a first rotational gate 113, a first stop member 114, a base member 150, a first line guide 151, a second line guide 122, a third line guide 141, and a lock button 152.

Figure 3:
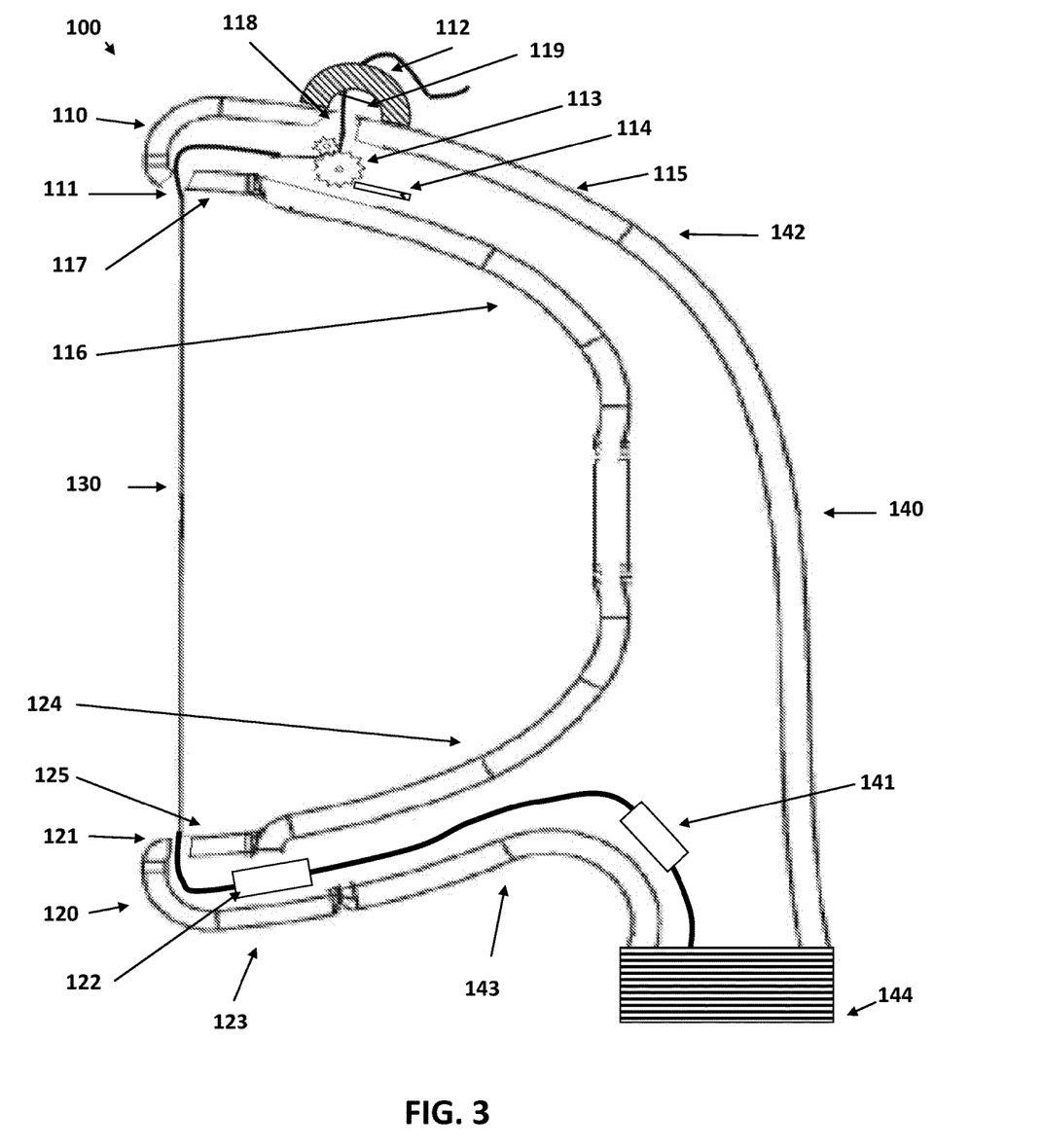
FIG. 3 illustrates a front close-up view of a vertical support of a dental floss pick, in accordance with one embodiment of the present invention.

FIG. 3 illustrates a front close-up view of a vertical support 140 of a dental floss pick 100, in accordance with one embodiment of the present invention.

Figure 4:
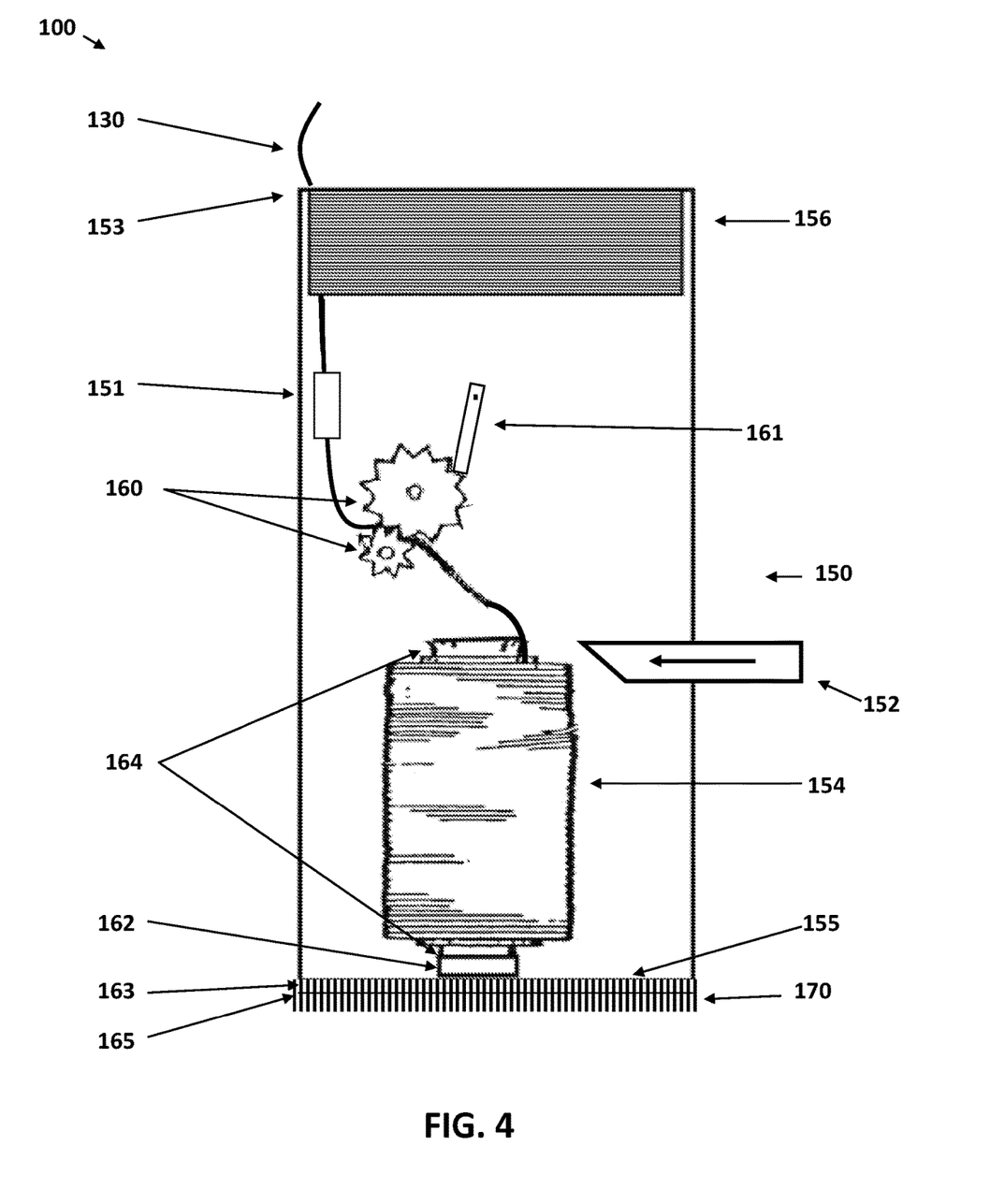
FIG. 4 illustrates a front close-up view of a base member of a dental floss pick, in accordance with one embodiment of the present invention.

FIG. 4 illustrates a front close-up view of a base member 150 of a dental floss pick 100, in accordance with one embodiment of the present invention.

Referring to FIGS. 3 and 4, the first elongate arm 110 has a first surface 115, a second surface 116, and a third surface 117. The first surface 115 is curved, the second surface 116 is biased inwardly therein, and the third surface 117 is positioned between the first surface 115 and the second surface 116.

The second elongate arm 120 has a first surface 123, a second surface 124, and a third surface 125. The first surface 123 is curved, the second surface 124 is biased inwardly therein, and the third surface 125 is positioned between the first surface 123 and the second surface 124. The second surface 116 of the first elongate arm 110 faces the second surface 124 of the second elongate arm 120.

The third surface 117 of the first elongate arm 110 and the third surface 125 of the second elongate arm 120 are in spaced parallel relationship. The second elongate arm 120 has an identical material and thickness of the first elongate arm 110.

Preferably, the first elongate arm 110 and the second elongate arm 120 may comprise one or more materials selected from the group consisting of: metal, plastic, and rubber. The first elongate arm 110 and the second elongate arm 120 may comprise material suitable for graphic decoration. The first elongate arm 110 and the second elongate arm 120 may further provide a convenient surface to graphically decorate such as drawings or text.

The length of floss 130 may be positioned between the third surface 117 of the first elongate arm 110 and the third surface 125 of the second elongate arm 120.

The vertical support 140 has a first end 142, a second end 143, and an open bottom 144. The first elongate arm 110 is secured to the first end 142. The second elongate arm 120 is secured to the second end 143. The vertical support 140 has the first 110 and second 120 elongate arms being spaced apart from each other providing tension to the first 110 and second 120 elongate arms to retain the length of floss 130. The open bottom 144 has a first threading 145.

Preferably, the first elongate arm 110 and the second elongate arm 120 can be secured to the vertical support 140 in a variety of ways, including heat welding and adhesives. However, the first elongate arm 110 and the second elongate arm 120 are preferably secured to the vertical support 140 via a heat welding that securely holds the first elongate arm 110 and the second elongate arm 120 in position.

The elongate arms 110, 120 and the vertical support 140 together may also be a one-piece construction formed of plastic in a single operation. The elongate arms 110, 120 and the vertical support 140 may further comprise at least one of a waterproof material and a water resistant material.

The third line guide 141 is positioned adjacent to the open bottom 144 of the vertical support 140 for enabling the length of floss 130 to travel within the vertical support 140. The third line guide 141 prevents the floss from moving through the vertical support 140 in the wrong direction. Preferably, the third line guide 141 is secured to the vertical support 140 via a heat welding that securely holds the third line guide 141 in position.

The first channel 111 is disposed in the third surface 117 of the first elongate arm 110. The first channel 111 is configured to secure the length of floss 130 therein. The second channel 121 is disposed in the third surface 125 of the second elongate arm 120 for enabling the length of floss 130 to exit the second elongate arm 120. The second channel 121 is configured to secure the length of floss 130 therein.

The second line guide 122 is positioned adjacent to the second channel 121 for enabling the length of floss 130 to exit outwardly from the second elongated arm 120.

The second line guide 122 prevents the floss from moving through the second elongate arm 120 in the wrong direction. Preferably, the second line guide 122 is secured to the second elongate arm 120 via a heat welding that securely holds the second line guide 122 in position.

The length of floss 130 is configured to extend out of the second elongate arm 120 through the second channel 121 of the second elongate arm 120 and straight between the third surface 117 of the first elongate arm 110 and the third surface 125 of the second elongate arm 120.

The first surface 115 of the first elongate arm 110 has an aperture 118 for enabling the length of floss 130 to exit the first elongate arm 110.

The cutting member 112 is secured to the first surface 115 of the first elongate arm 110 for cutting the length of floss 130. The cutting member 112 may have a C-shaped blade 119 extending downwardly therefrom.

Preferably, the cutting member 112 can be secured to the first surface 115 of the first elongate arm 110 in a variety of ways, including heat welding and adhesives. The cutting member 112 may comprise one or more materials selected from the group consisting of: metal, plastic, and rubber.

The first rotational gate 113 is located within the first elongate arm 110. The first stop member 114 is located adjacent to the first rotational gate 113. The first stop member 114 is arranged to prevent rotational movement of the first rotational gate 113 in a rearward direction opposite to a forward direction of the length of floss 130 to prevent the length of floss 130 from moving past the first rotational gate 113 in the rearward direction to retain the length of floss 130 between the third surface 117 of the first elongate arm 110 and the third surface 125 of the second elongate arm 120 when lateral pressure is applied to the length of floss 130.

Preferably, the first rotational gate 113 and the first stop member 114 can be secured to the first elongate arm 110 in a variety of ways, including heat welding and adhesives. Preferably, the first rotational gate 113 and the first stop member 114 may comprise one or more materials selected from the group consisting of: metal, plastic, and rubber.

In an exemplary embodiment and as illustrated in FIGS. 3 and 4, the length of floss 130 may exit the first elongate arm 110 after passing the first rotational gate 113. The first stop member 114 prevents the used floss from be pulled back through the first elongate arm 110 in the wrong direction.

The floss can also be advanced by pulling the used floss after it has exited the first elongate arm 110 or after it had passed the first rotational gate 113. After the user has finished flossing, the floss could be removed from the dental floss pick 100 by pulling all of the used floss out of the aperture 118.

The base member 150 has an open top 153, a feed portion of floss 154, and a closed bottom 155. The open top 153 has a second threading 156. The second threading 156 is complementary to the first threading 145 of the vertical support 140 to secure the base member 150 to the vertical support 140. The feed portion of floss 154 is positioned between the open top 153 and the closed bottom 155.

Preferably, the base member 150 and the vertical support 140 together may be a one-piece construction formed of plastic in a single operation. The base member 150 and the vertical support 140 may comprise one or more materials selected from the group consisting of: metal, plastic, and rubber. The base member 150 and the vertical support 140 may further comprise at least one of a waterproof material and a water resistant material. The base member 150 and the vertical support 140 may comprise material suitable for graphic decoration. The base member 150 and the vertical support 140 may further provide a convenient surface to graphically decorate such as drawings or text.

The first line guide 151 is positioned adjacent to the open top 153 of the base member 150 for enabling the length of floss 130 to exit outwardly from the base member 150. The first line guide 151 prevents the floss from moving through the base member 150 in the wrong direction. The first line guide 151 is preferably secured to the base member 150 via a heat welding that securely holds the first line guide 151 in position.

The length of floss 130 is configured to travel within the vertical support 140 and the base member 150.

The length of floss 130 is configured to extend between the first elongate arm 110 and the feed portion of floss 154.

The lock button 152 is disposed in the base member 150. The lock button 152 is configured to protrude through the base member 150 for enabling selective operation by a user. The lock button 152 is configured to move toward the feed portion of floss 154. The lock button 152 is configured to resiliently restrain the feed portion of floss 154 when lateral pressure is applied to the lock button 152 by the user.

In an exemplary embodiment, and as illustrated in FIG. 4, when lateral pressure is applied to the lock button 152 by the user, the lock button 152 generates pressure which exerts pressure onto the feed portion of floss 154. Such pressure tightens and locks the floss to be held in place. As a result, the tensioning of the feed portion of floss 154 happens directly on the first and second elongate arms 110, 120 and the entire floss which ensures effective retention of the length of floss 130 between the first and the second elongate arms 110, 120 when it is in use.

Preferably, the lock button 152 can be secured to the base member 150 in a variety of ways, including heat welding and adhesives. The lock button 152 may comprise one or more materials selected from the group consisting of: metal, plastic, and rubber.

In an exemplary embodiment, and as illustrated in FIG. 4, a dental floss pick 100 may include a second rotational gate 160, a second stop member 161, a spool 162, and a horizontal support 163.

The second rotational gate 160 is located within the base member 150. The second stop member 161 is located adjacent to the second rotational gate 160. The second stop member 161 is arranged to prevent rotational movement of the second rotational gate 160 in a rearward direction opposite to a forward direction of the length of floss 130 to prevent the length of floss 130 from moving past the second rotational gate 160 in the rearward direction. The length of floss 130 may exit the base member 150 after passing the second rotational gate 160. The second stop member 161 prevents the floss from be pulled back through the base member 150 in the wrong direction.

Preferably, the second rotational gate 160 and the second stop member 161 can be secured to the base member 150 in a variety of ways, including heat welding and adhesives. The second rotational gate 160 and the second stop member 161 may comprise one or more materials selected from the group consisting of: metal, plastic, and rubber.

The spool 162 has an axis 164. The spool 162 is configured to be positioned within the base member 150. Preferably, the spool 162 can be secured to the base member 150 in a variety of ways, including heat welding and adhesives. However, the spool 162 is preferably secured to the base member 150 via a heat welding that securely holds the spool 162 in position. The spool 162 may comprise one or more materials selected from the group consisting of: metal, plastic, and rubber.

The horizontal support 163 has a bottom surface 165. The horizontal support 163 is secured to the closed bottom 155 of the base member 150. A plurality of reinforcing ribs 170 is formed at equal intervals in the vertical direction on the bottom surface 165 of the horizontal support 163. Preferably, the horizontal support and the plurality of reinforcing ribs may comprise one or more materials selected from the group consisting of: plastic and rubber.

Thus, the present invention disclosed herein provides an improved dental floss pick 100 that could allow a user to re-use without risking redistributing bacteria or polluting the environment by implementing such elongate arms, vertical support, rotational gates, stop members, lock button, and base member that could allow a user to easily replace its used floss with a new segment of floss without wasting the used floss pick.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A dental floss pick, comprising:
   a length of floss;
   a first elongate arm having a first surface, a second surface, and a third surface, the first surface being curved, the second surface being biased inwardly therein, the third surface being positioned between the first surface and the second surface;
   a first channel disposed in the third surface of the first elongate arm, wherein the first channel is configured to secure the length of floss therein;
   an aperture disposed on the first surface of the first elongate arm for enabling the length of floss to exit the first elongate arm;
   a cutting member being secured to the first surface of the first elongate arm for cutting the length of floss;
   a first rotational gate located within the first elongate arm;
   a first stop member located adjacent to the first rotational gate, the first stop member arranged to prevent rotational movement of the first rotational gate in a rearward direction opposite to a forward direction of the length of floss to prevent the length of floss from moving past the first rotational gate in the rearward direction;

a second elongate arm having a first surface, a second surface, and a third surface, the first surface being curved, the second surface being biased inwardly therein, the third surface being positioned between the first surface and the second surface;

a second channel disposed in the third surface of the second elongate arm for enabling the length of floss to exit the second elongate arm, wherein the second channel is configured to secure the length of floss therein;

a vertical support having a first end, a second end, and an open bottom, the first elongate arm being secured to the first end, the second elongate arm being secured to the second end, the vertical support having the first and second elongate arms being spaced apart from each other providing tension to the first and second elongate arms to retain the length of floss, the open bottom having a first threading;

a base member having an open top, a feed portion of floss, and a closed bottom; the open top having a second threading, the second threading being complementary to the first threading of the vertical support to secure the base member to the vertical support; the feed portion of floss being positioned between the open top and the closed bottom;

a first line guide being positioned adjacent to the open top of the base member for enabling the length of floss to exit outwardly from the base member;

a lock button disposed in the base member, the lock button being configured to protrude through the base member for enabling selective operation by a user, the lock button being configured to move toward the feed portion of floss, the lock button being configured to resiliently restrain the feed portion of floss when lateral pressure is applied to the lock button by the user;

wherein the second surface of the first elongate arm faces the second surface of the second elongate arm;

wherein the third surface of the first elongate arm and the third surface of the second elongate arm are in spaced parallel relationship;

wherein the second elongate arm has an identical material and thickness of the first elongate arm;

wherein the length of floss is configured to extend between the first elongate arm and the feed portion of floss; and wherein the length of floss is configured to extend out of the second elongate arm through the second channel of the second elongate arm and straight between the third surface of the first elongate arm and the third surface of the second elongate arm.

2. The dental floss pick according to claim 1, wherein a second rotational gate is located within the base member.

3. The dental floss pick according to claim 1, wherein a second stop member is located adjacent to the second rotational gate, the second stop member arranged to prevent rotational movement of the second rotational gate in a rearward direction opposite to a forward direction of the length of floss to prevent the length of floss from moving past the second rotational gate in the rearward direction.

4. The dental floss pick according to claim 1, wherein a horizontal support has a bottom surface, the horizontal support being secured to the close bottom of the base member, a plurality of reinforcing ribs being formed at equal intervals in the vertical direction on the bottom surface of the horizontal support.

5. The dental floss pick according to claim 1, wherein a spool has an axis, the spool being configured to be positioned within the base member.

6. The dental floss pick according to claim 1, wherein a second line guide is positioned adjacent to the second channel for enabling the length of floss to exit outwardly from the second elongated arm.

7. The dental floss pick according to claim 1, wherein the cutting member has a C-shaped blade extending downwardly therefrom.

8. A dental floss pick, comprising:
a length of floss;
a first elongate arm having a first surface, a second surface, and a third surface, the first surface being curved, the second surface being biased inwardly therein, the third surface being positioned between the first surface and the second surface;
a first channel disposed in the third surface of the first elongate arm, wherein the first channel is configured to secure the length of floss therein;
an aperture disposed on the first surface of the first elongate arm for enabling the length of floss to exit the first elongate arm;
a cutting member being secured to the first surface of the first elongate arm for cutting the length of floss;
a first rotational gate located within the first elongate arm;
a first stop member located adjacent to the first rotational gate, the first stop member arranged to prevent rotational movement of the first rotational gate in a rearward direction opposite to a forward direction of the length of floss to prevent the length of floss from moving past the first rotational gate in the rearward direction;
a second elongate arm having a first surface, a second surface, and a third surface, the first surface being curved, the second surface being biased inwardly therein, the third surface being positioned between the first surface and the second surface;
a second channel disposed in the third surface of the second elongate arm for enabling the length of floss to exit the second elongate arm, wherein the second channel is configured to secure the length of floss therein;
a vertical support having a first end, a second end, and an open bottom, the first elongate arm being secured to the first end, the second elongate arm being secured to the second end, the vertical support having the first and second elongate arms being spaced apart from each other providing tension to the first and second elongate arms to retain the length of floss, the open bottom having a first threading;
a third line guide being positioned adjacent to the open bottom of the vertical support for enabling the length of floss to travel within the vertical support;
a base member having an open top, a feed portion of floss, and a closed bottom; the open top having a second threading, the second threading being complementary to the first threading of the vertical support to secure the base member to the vertical support; the feed portion of floss being positioned between the open top and the closed bottom;
a lock button disposed in the base member, the lock button being configured to protrude through the base member for enabling selective operation by a user, the lock button being configured to move toward the feed portion of floss, the lock button being configured to resiliently restrain the feed portion of floss when lateral pressure is applied to the lock button by the user;

wherein the second surface of the first elongate arm faces the second surface of the second elongate arm;

wherein the third surface of the first elongate arm and the third surface of the second elongate arm are in spaced parallel relationship;

wherein the second elongate arm has an identical material and thickness of the first elongate arm;

wherein the length of floss is configured to extend between the first elongate arm and the feed portion of floss; and wherein the length of floss is configured to extend out of the second elongate arm through the second channel of the second elongate arm and straight between the third surface of the first elongate arm and the third surface of the second elongate arm.

9. The dental floss pick according to claim 8, wherein a second rotational gate located within the base member.

10. The dental floss pick according to claim 8, wherein a second stop member is located adjacent to the second rotational gate, the second stop member arranged to prevent rotational movement of the second rotational gate in a rearward direction opposite to a forward direction of the length of floss to prevent the length of floss from moving past the second rotational gate in the rearward direction.

11. The dental floss pick according to claim 8, wherein a horizontal support has a bottom surface, the horizontal support being secured to the close bottom of the base member, a plurality of reinforcing ribs being formed at equal intervals in the vertical direction on the bottom surface of the horizontal support.

12. The dental floss pick according to claim 8, wherein a spool has an axis, the spool being configured to be positioned within the base member.

13. The dental floss pick according to claim 8, a second line guide is positioned adjacent to the second channel for enabling the length of floss to exit outwardly from the second elongated arm.

14. The dental floss pick according to claim 8, wherein the cutting member has a C-shaped blade extending downwardly therefrom.

15. A dental floss pick, comprising:
a length of floss;
a first elongate arm having a first surface, a second surface, and a third surface, the first surface being curved, the second surface being biased inwardly therein, the third surface being positioned between the first surface and the second surface;
a first channel disposed in the third surface of the first elongate arm, wherein the first channel is configured to secure the length of floss therein;
an aperture disposed on the first surface of the first elongate arm for enabling the length of floss to exit the first elongate arm;
a cutting member being secured to the first surface of the first elongate arm for cutting the length of floss;
a first rotational gate located within the first elongate arm;
a first stop member located adjacent to the first rotational gate, the first stop member arranged to prevent rotational movement of the first rotational gate in a rearward direction opposite to a forward direction of the length of floss to prevent the length of floss from moving past the first rotational gate in the rearward direction;
a second elongate arm having a first surface, a second surface, and a third surface, the first surface being curved, the second surface being biased inwardly therein, the third surface being positioned between the first surface and the second surface;
a second channel disposed in the third surface of the second elongate arm for enabling the length of floss to exit the second elongate arm, wherein the second channel is configured to secure the length of floss therein;
a vertical support having a first end, a second end, and an open bottom, the first elongate arm being secured to the first end, the second elongate arm being secured to the second end, the vertical support having the first and second elongate arms being spaced apart from each other providing tension to the first and second elongate arms to retain the length of floss, the open bottom having a first threading;
a base member having an open top, a feed portion of floss, and a closed bottom; the open top having a second threading, the second threading being complementary to the first threading of the vertical support to secure the base member to the vertical support; the feed portion of floss being positioned between the open top and the closed bottom;
a lock button disposed in the base member, the lock button being configured to protrude through the base member for enabling selective operation by a user, the lock button being configured to move toward the feed portion of floss, the lock button being configured to resiliently restrain the feed portion of floss when lateral pressure is applied to the lock button by the user;
wherein the second surface of the first elongate arm faces the second surface of the second elongate arm;
wherein the third surface of the first elongate arm and the third surface of the second elongate arm are in spaced parallel relationship;
wherein the second elongate arm has an identical material and thickness of the first elongate arm;
wherein the length of floss is configured to extend between the first elongate arm and the feed portion of floss;
wherein the length of floss is configured to extend out of the second elongate arm through the second channel of the second elongate arm and straight between the third surface of the first elongate arm and the third surface of the second elongate arm; and wherein the length of floss is configured to travel within the vertical support and the base member.

16. The dental floss pick according to claim 15, wherein a second rotational gate located within the base member.

17. The dental floss pick according to claim 15, wherein a second stop member is located adjacent to the second rotational gate, the second stop member arranged to prevent rotational movement of the second rotational gate in a rearward direction opposite to a forward direction of the length of floss to prevent the length of floss from moving past the second rotational gate in the rearward direction.

18. The dental floss pick according to claim 15, wherein a horizontal support has a bottom surface, the horizontal support being secured to the close bottom of the base member, a plurality of reinforcing ribs being formed at equal intervals in the vertical direction on the bottom surface of the horizontal support.

19. The dental floss pick according to claim 15, wherein a spool has an axis, the spool being configured to be positioned within the base member.

20. The dental floss pick according to claim 15, a second line guide is positioned adjacent to the second channel for enabling the length of floss to exit outwardly from the second elongated arm.

* * * * *